UNITED STATES PATENT OFFICE.

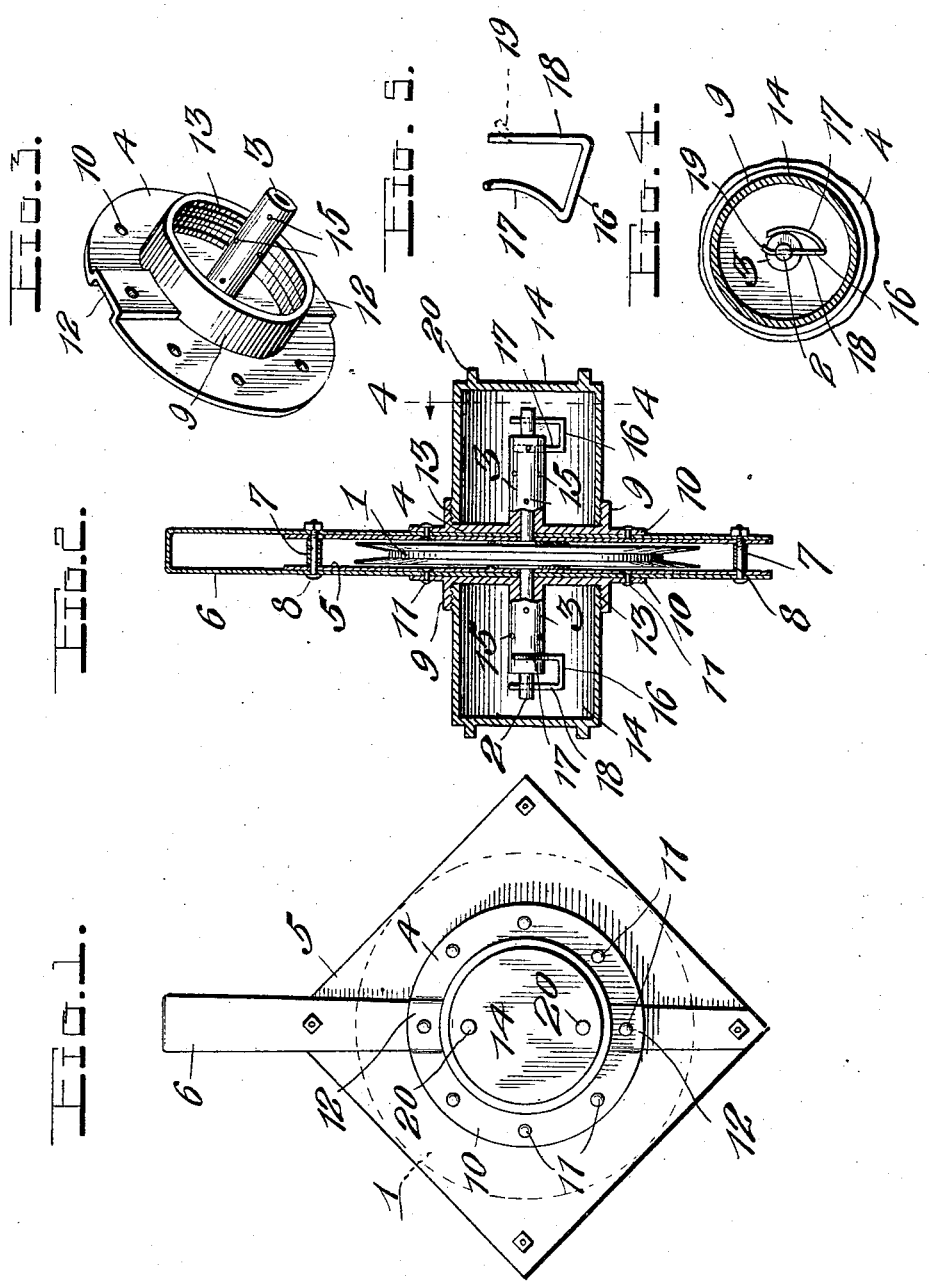

WILLIAM J. WITHERS, OF CONWAY, NEW HAMPSHIRE, ASSIGNOR OF ONE-HALF TO MURDOCK J. McNEIL, OF CONWAY, NEW HAMPSHIRE.

SELF-LUBRICATING PULLEY.

968,624.  Specification of Letters Patent.  Patented Aug. 30, 1910.

Application filed May 18, 1910. Serial No. 562,043.

*To all whom it may concern:*

Be it known that I, WILLIAM J. WITHERS, a citizen of the United States, residing at Conway, in the county of Carroll and State of New Hampshire, have invented certain new and useful Improvements in Self-Lubricating Pulleys, of which the following is a specification, reference being had to the accompanying drawings.

This invention relates to improvements in pulleys or sheaves and lubricating means therefor.

The object of the invention is to provide a simple and practical pulley or sheave block of strong and durable and inexpensive construction and which has improved means for supplying grease or other lubricant to the journals of the wheel.

With these and other objects in view the invention consists of the novel features of construction, combination and arrangement of parts hereinafter fully described and claimed and illustrated in the accompanying drawings, in which—

Figure 1 is a side elevation of the improved self lubricating pulley; Fig. 2 is a vertical sectional view; Fig. 3 is a perspective view of one of the body members which carries the journal bearing; Fig. 4 is a detail section taken on the plane indicated by the line 4—4 in Fig. 2; and Fig. 5 is a perspective view of one of the grease or lubricant agitators.

Referring more particularly to the drawings 1 denotes a pulley or sheave of any suitable form and construction provided with oppositely projecting journals 2, which latter project through and rotate in cylindrical bearing sleeves 3 formed integral with two body members 4 of the block or casing for the pulley. This pulley block also comprises two side plates 5 preferably made of sheet metal and having rectangular shape, and a shackle or hanger 6 which is formed from a strip of metal bent into U-form and having its parallel ends or arms arranged diagonally across the outer faces of the plates 5. The plates 5 are held in spaced relation by spacing sleeves 7 arranged between them adjacent their corners and they are securely united by transverse bolts 8 or similar fastenings which pass through the sleeves 7, and two of which also pass through the arms of the shackle or hanger 6. The two body members 4 of the pulley block are preferably circular in shape and have projecting from their outer faces annular or cylindrical flanges 9 which are concentric with the bearing sleeves 3 and which are arranged at a suitable distance from the edges of said body members whereby the latter are provided with radially projecting flanges 10 which are riveted as shown at 11 to the plates 5 and also to the arms of the shackle 6.

The bottom faces of the body members 4 have formed in them transverse channels 12 for the reception of the arms of the shackle 6, which arms as well as the plates 5 have openings which register with the bores of the bearing sleeves 3 for the reception of the journals 2. The cylindrical flanges 9 on the body members 4 are internally screw threaded as shown at 13 for the reception of the open ends of cylindrical lubricator boxes or cups 14 adapted to contain grease or other lubricant supplied to the journals 2.

In order to insure the proper lubrication of the journals 2, the bearing sleeves 3 are formed with radial openings 15 and said journals carry rotary agitators or stirrers 16 which dip down into the grease and throw it up on to the bearing sleeves. The agitators 16 are formed from pieces of wire bent into U-form and each having a curved arm 17 to extend partly around one of the sleeves 3 and a straight arm 18 which latter after being passed through a transverse opening in the projecting end of one of the journals 2, is bent angularly as indicated at 19 whereby it will be retained in position and prevented from dropping off of the journal. In order to permit the grease boxes or cups 14 to be readily screwed into and out of the flanges 9 by ordinary spanner wrenches or similar tools, pairs of lugs 20 are formed on the outer ends of said boxes as shown.

From the foregoing it will be seen that my invention produces an exceedingly simple and practical self lubricating pulley or sheave, since the several parts may be produced and assembled at a small cost and will be exceedingly strong and durable.

The peculiar construction of the grease boxes and the bearing sleeves insures proper lubrication for the journals of the pulley or sheave, and not only enables a large quantity of lubricant to be supplied to the journals but also permits the boxes to be quickly and easily refilled.

While I have shown and described the preferable embodiment of the invention it will be understood that the same is susceptible of many minor modifications without departing from the essential features or sacrificing any of the advantages thereof.

While but one pulley or sheave is shown in the block, I wish it understood that a plurality of sheaves may be mounted in the same block.

Having thus described the invention what is claimed is:—

1. The combination of a pulley provided with oppositely projecting journals, casing members disposed on opposite sides of the pulley and provided with outwardly projecting bearing sleeves to receive said journals, means uniting said casing members and lubricant boxes connected to the outer sides of said casing members and inclosing said bearing sleeves and journals.

2. The combination of a pulley provided with oppositely projecting journals, casing members disposed on opposite sides of the pulley and provided with outwardly projecting bearing sleeves to receive said journals, casing plates arranged upon opposite sides of the pulley and united to the opposing inner faces of said casing members, a U-shaped shackle united to said casing plates and members, and lubricant boxes arranged on the outer faces of the casing members and inclosing said bearing sleeves and journals.

3. The combination of a pulley provided with oppositely projecting journals, casing members disposed on opposite sides of the pulley and provided with outwardly projecting bearing sleeves to receive said journals, means uniting said casing members, lubricant boxes arranged on the outer faces of the casing members and inclosing said bearing sleeves and journals, the extremities of the journals projecting beyond the ends of the bearing sleeves and the latter being apertured, an agitating device carried by the projecting extremities of the journals and adapted to throw grease up on to the bearing sleeves.

4. The combination of a pulley provided with oppositely projecting journals, casing members disposed on opposite sides of the pulley and provided with outwardly projecting bearing sleeves to receive said journals, means uniting said casing members, lubricant boxes arranged on the outer faces of the casing members and inclosing said bearing sleeves and journals, the extremities of the journals projecting beyond the ends of the bearing sleeves and the latter being apertured, and lubricant agitators each formed from a piece of wire bent into U-form and having one end passed through a transverse opening in one end of the journals and its other end bent to extend around one of the bearing sleeves.

In testimony whereof I hereunto affix my signature in the presence of two witnesses.

WILLIAM J. WITHERS.

Witnesses:
HERBERT L. YEATON,
M. L. EVANS.